Dec. 3, 1968 N. V. GUSCHING 3,414,019
ELECTRO-FLUID CONTROL SYSTEM
Filed Oct. 13, 1966 5 Sheets-Sheet 1

INVENTOR.
NAGLE V. GUSCHING
BY Woodling, Krost,
Granger and Rust,
attys.

Dec. 3, 1968       N. V. GUSCHING       3,414,019
           ELECTRO-FLUID CONTROL SYSTEM
Filed Oct. 13, 1966                5 Sheets-Sheet 4

INVENTOR.
NAGLE V. GUSCHING
BY Woodling, Krost,
Granger and Rust,
attys.

Dec. 3, 1968                N. V. GUSCHING                3,414,019
                         ELECTRO-FLUID CONTROL SYSTEM
Filed Oct. 13, 1966                                    5 Sheets-Sheet 5
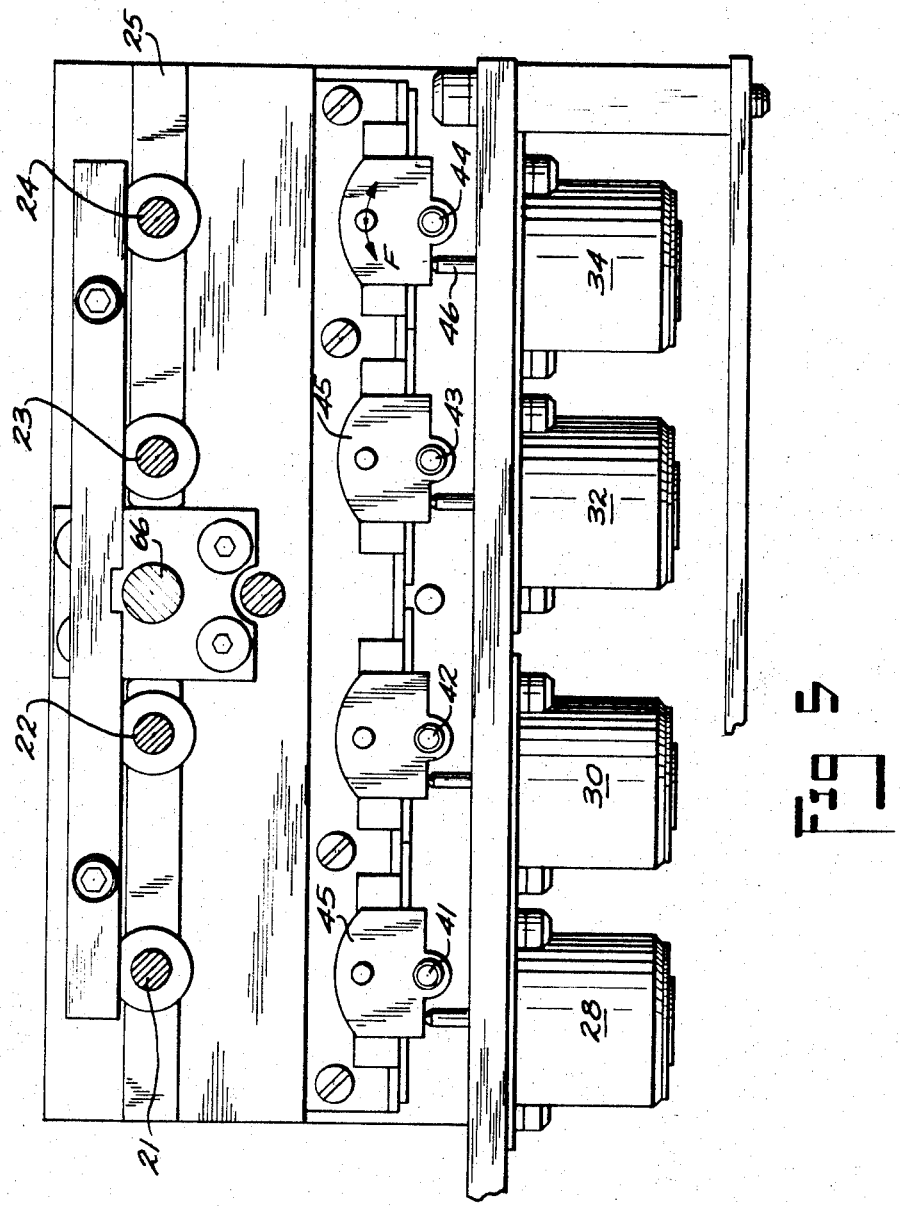
INVENTOR.
NAGLE V. GUSCHING United States Patent Office 3,414,019
Patented Dec. 3, 1968

3,414,019
ELECTRO-FLUID CONTROL SYSTEM
Nagle V. Gusching, Sidney, Ohio, assignor to The Monarch Machine Tool Company, a corporation of Ohio
Filed Oct. 13, 1966, Ser. No. 586,460
12 Claims. (Cl. 137—625.65)

ABSTRACT OF THE DISCLOSURE

The disclosure shows an electro-hydraulic control system which may be used to shift gears in a geared transmission. A rotary tap switch selectively energizes one or more of plural solenoids, which in turn pivot rocker plates into one of three positions each. The rocker plates swing plural abutment levers in first paths into one of three positions each. The abutment levers are pivoted on clapper plates which are pulled together along a second path transverse to the first path, by a fluid cylinder motor to move plural fluid valves into one of three positions. The selected positions of the plural fluid valves then effects the shifting of gears in the geared transmission.

---

The invention relates in general to control systems and more particularly to an electrically selected fluid pressure operated control system, for example, for use in selecting an output speed of a geared transmission.

The invention may be incorporated in an electrically controlled fluid operated control system, comprising, in combination, a housing, solenoid means on said housing having first and second positions, abutment means, linkage means interconnecting said solenoid means and said abutment means to move same into first and second positions along a first path, power means carried on said housing and connected to move said abutment means in a direction in a second path transverses to said first path between first and second positions, a fluid control valve carried in said housing and having first and second positions along said second path, means to move said power means to move said abutment means to said first position in said second path spaced from said control valve, means to control said solenoid means to move said abutment means in said first path to one of said first and second positions, and means to control said power means to move said abutment means to said second position thereof in said second path with said abutment means cooperating with said control valve to move same into one of said first and second positions thereof.

In many electrically operated control devices, for example those operated by selectively energizable solenoids, the solenoids which are commercially available have a limited amount of force. Accordingly, if the control valves for controlling fluid flow to move a geared transmission were to have the control valves moved directly by the solenoids, there often would be insufficient power. This would be especially true should some dirt get in the way of the movement of one of the valves and in such case the selected geared speed of the transmission would not be completed. Such geared transmission may be used in the headstock of a lathe, for example, wherein many speeds such as 12 or 16 are often desired in order to give a suitable range of headstock spindle speeds. Such gears may be large and the shifting power required is correspondingly large requiring large control valves. To have such valves moved directly by solenoids would require an excessive amount of power from such solenoid.

Accordingly, an object of the invention is to provide an electrically selected fluid operated control system to select the speeds of a geared transmission.

Another object of the invention is to provide an electrically selected abutment with the abutment moved by hydraulic power to move a valve with a force greater than the solenoid force.

Another object of the invention is to provide an electro-fluid control system with a considerable amplification of forces.

Another object of the invention is to provide an electro-fluid control system wherein electro-motive means provides a movement in a first path and fluid power means provides motion in a second path transverse thereto to partake of the control effected by the electro-motive means.

Other objects and a fuller understanding of the invention may be had by referring to the following description and claims, taken in conjunction with the accompanying drawings, in which:

FIGURE 5 is a sectional view on line 5—5 of FIGURE 3.

Figure 1:
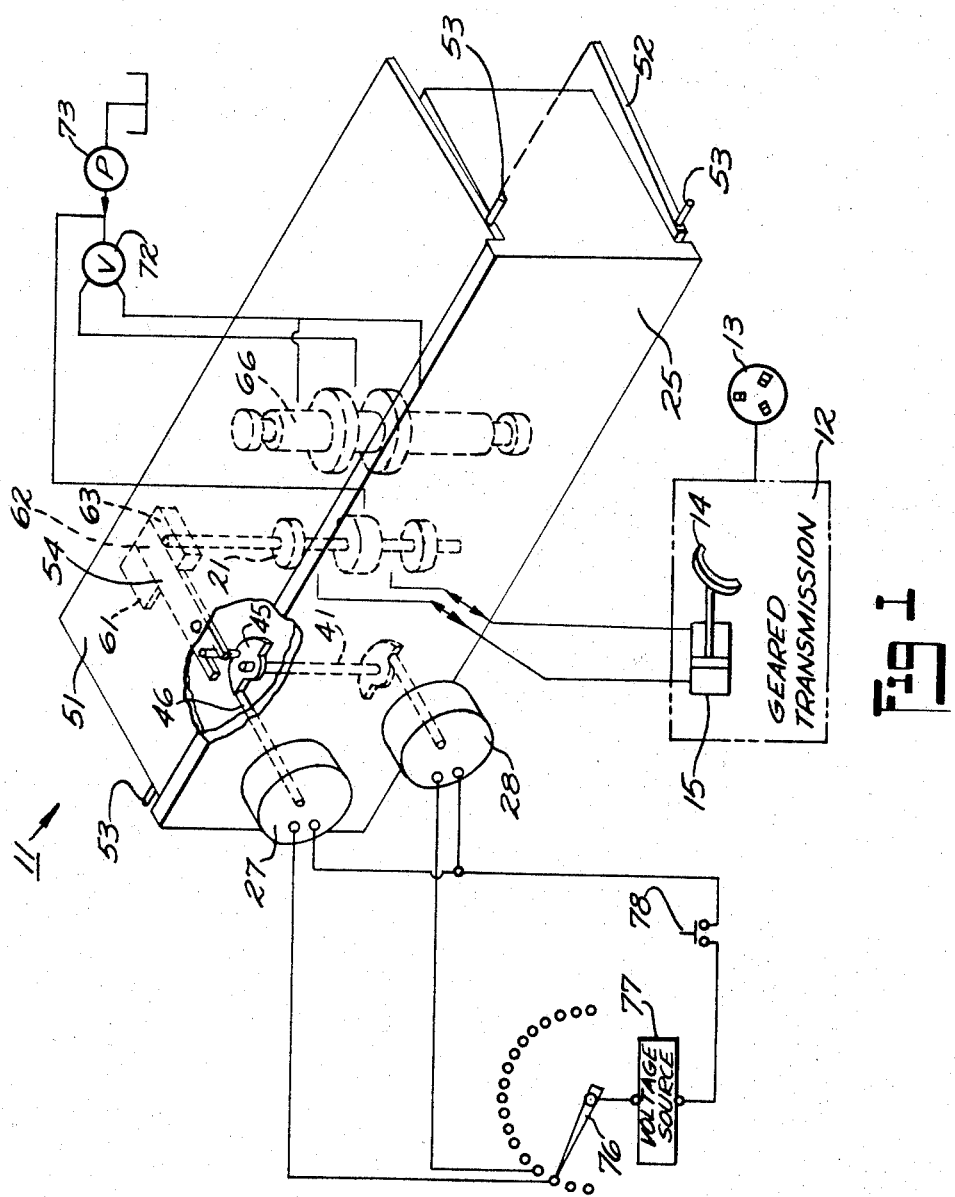
FIGURE 1 is a partially schematic and partially isometric drawing of an electro-fluid control system embodying the invention.

The figures of the drawing illustrate a preferred embodiment of an electro-fluid control system 11 embodying the invention. The control system 11 may be used to select a proper geared speed of a geared transmission 12, for example, a transmission for a headstock spindle 13. Such transmission may have many speeds such as twelve or sixteen merely as an example. The transmission 12 has a plurality of yokes 14 moved by hydraulic yoke motors 15 to shift the gears in the transmission 12, and accordingly select the various geared speeds. The plurality of yoke motors 15 are controlled by a plurality of control valves 21, 22, 23 and 24 and because these may be of well-known construction, they are not illustrated in detail and only one is shown schematically in FIGURE 1.

Figure 2:
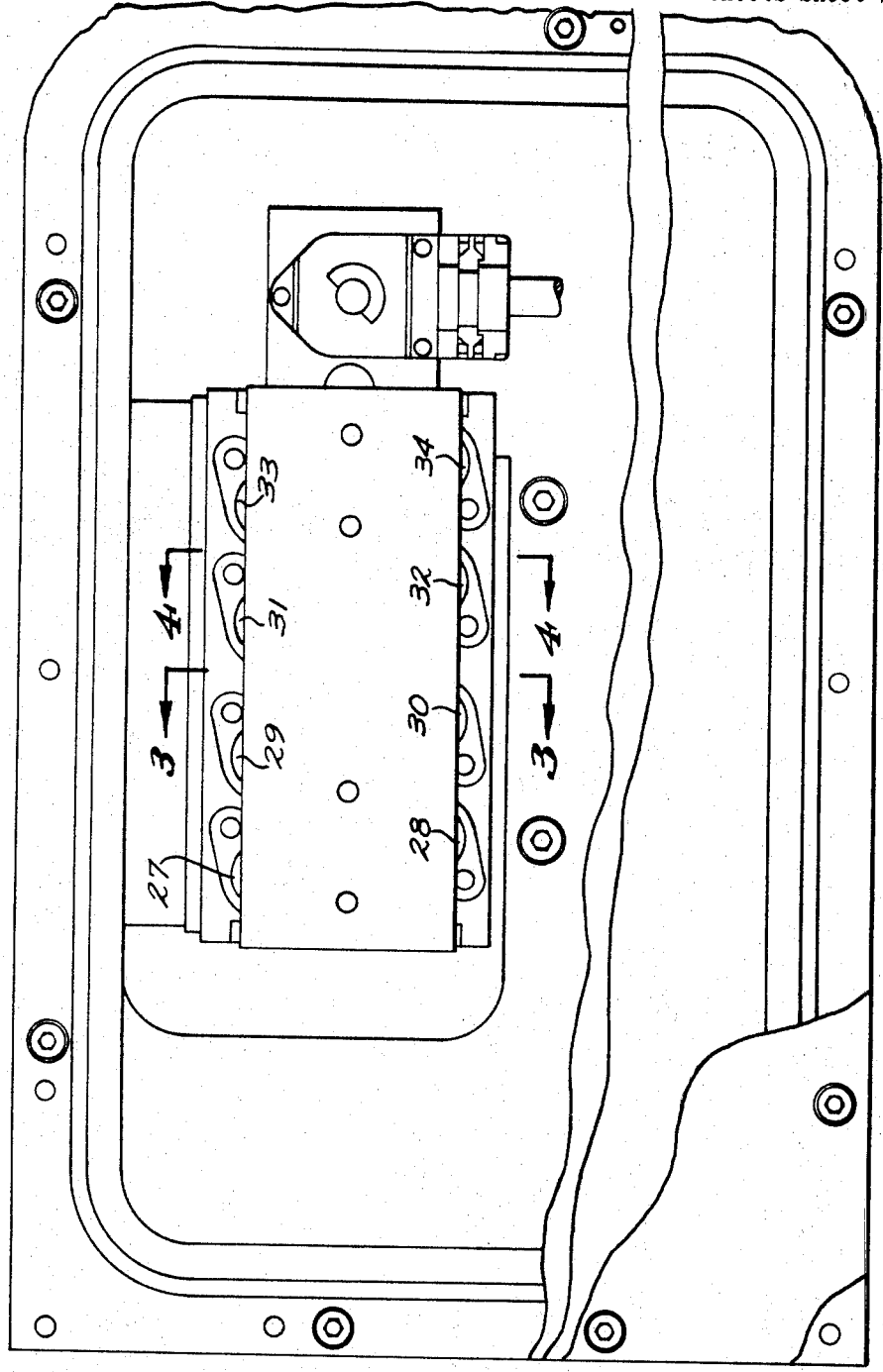
FIGURE 2 is a front view of the control system of the invention.

The plurality of control valves are shown as an example as being controlled in turn by first through fourth control valves 21–24 mounted in a housing 25. These valves are shown in FIGURE 5 and are axially reciprocable spool valves. The housing 25 carries a plurality of electro-motive means shown in this case as first through eighth solenoids 27–34, shown in FIGURE 2. The solenoid means 27–34 operate on abutment means 36 via linkage means 37.

The linkage means 37 includes first through fourth rocker shafts 41 through 44 journalled in the housing 25 for limited arcuate movement. Each rocker shaft fixedly carries a rocker plate 45 on each end thereof as part of the linkage means 37. The solenoids 27–34 are paired such as solenoids 31 and 32 to act on a pair of rocker plates 45 on each end of a rocker shaft such as rocker shaft 43, shown in FIGURE 4. The actuator plungers 46 of each of the solenoids act on the respective rocker plates 45 as best shown in FIGURES 1 and 5 to push on the rocker plates and move the rocker shaft a limited arcuate extent from a rotational neutral position. A torsion spring 47 is carried on each rocker shaft to urge the respective shaft into a rotational neutral position. Accordingly, each rocker plate 45 has three positions, a neutral mid-position and one position on each side thereof depending upon whether neither solenoid is energized or solenoid 31 or solenoid 32 of the pair operating on the particular rocker shaft is energized.

First and second clapper plates 51 and 52 are pivoted on pins 53 on the housing 25. Each clapper plate carries four abutment levers which form part of the abutment means 36. Each abutment lever 54 is pivoted at an intermediate point on a bearing 55 on the clapper plates 51 or 52. The end of each abutment lever 54 closer to the rocker plates 45 is forked to form a yoke 56 cooperating with a pin 57 which is a crank pin carried in each of the rocker plates 45. Accordingly as each rocker plate 45 is moved in its limited arcuate movement, each abutment lever 54 moves in a first path which is an arcuate path generally parallel to the respective clapper plate.

Each abutment lever 54 has an abutment end 60 remote from the forked end 56 as part of abutment means 36. This abutment end has first, second and third thicknesses of abutments 61, 62 and 63 respectively. One of the control valves 21–24 is adapted to cooperate with a pair of abutment levers 54, one on each of the clapper plates 51 and 52. The control valves cooperate with the abutment ends of such levers 54. The control valves 21–24 move axially along a second path and the abutment ends 60 of these levers 54 move along this same second path.

A hydraulic cylinder motor 66 is carried in the housing 25 and includes a cylinder 67 containing first and second pistons 68 and 69. Fluid entering a central port 70 will force the pistons 68 and 69 apart and these pistons are connected to the clapper plates 51 and 52 to force them apart. When fluid is exhausted from the central port 70 and is admitted to outer ports 71, then the pistons 68 and 69 are urged together to urge the clapper plates 51 and 52 toward each other. This hydraulic cylinder 66 may be controlled by a three-way valve 72 shown diagrammatically in FIGURE 1 and supplied with fluid pressure from a pump or other source 73.

A rotary tap switch 76, for example with a multiple stack, may be connected to a voltage source 77 through a start switch 78 to selectively energize the solenoids 27–34, as schematically indicated in FIGURE 1.

Figure 3:
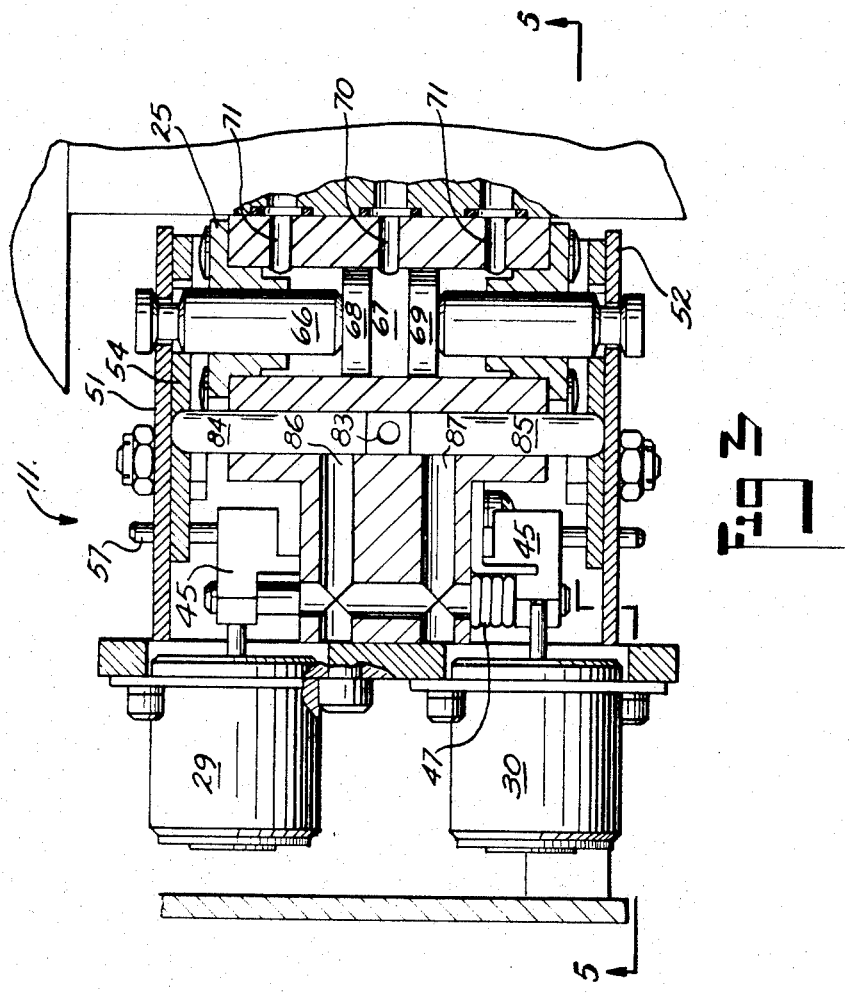
FIGURE 3 is a sectional view on line 3—3 of FIGURE 2.

Fluid under pressure enters through a port 83 between two plungers 84 and 85. When the clapper plates 51 and 52 are spread apart, then fluid may flow from the inlet port 83 to outlet ports 86 and 87 which are at that time uncovered by the respective plungers 84 and 85. This is a hydraulic interlock system which gives information that the clapper plates 51 and 52 have returned to the closed position as shown in FIGURE 3. If they have not closed, then fluid flow is not blocked to one or the other of the outlet ports 86 and 87 thus giving information that the shift has malfunctioned and indicating that the control valves 21 through 24 are not properly positioned. In such case where fluid is not blocked through the inlet port 83, the geared transmission 12 is not permitted to operate the output thereof, namely the headstock spindle 13.

*Operation*

To select a new geared speed of the geared transmission 12, the rotary tap switch 76 is moved to a new selected position to select the energization of the proper solenoid or solenoids. Next the start switch 78 is depressed and this may also actuate the solenoid actuator valve 72 to actuate the hydraulic cylinder motor 66 to spread the clapper plates 51 and 52 apart to the phantom position shown in FIGURE 4. This movement is generally parallel to the second path of movement of the control valves 21 and 24. This movement apart of the clapper plates 51 and 52 permits the abutment levers 54 to be swung or moved in a first path generally perpendicular to the second path without interference with the ends of the control valves 21 and 24. Also actuation of the start switch 78 will energize selected ones of the solenoids 27–34. This will rock selected ones of the rocker shafts 41–44 a limited arcuate extent or may leave some in the neutral mid-position. The swinging movements of the rocker shafts 41–44 is imparted to the rocker plates 45 and through the crank pins 57 and yokes 56 to the abutment levers 54 which form the abutment means 36. The abutment ends 60 of the abutment levers 54 accordingly move in a first arcuate path generally perpendicular to the second path. One of the first, second and third thickness abutments 61, 62 and 63, respectively, on these abutment levers 54 will thus be swung into a position in alignment with the end of the respective control valve 21–24. The first thickness abutment 61 may, if desired, be formed by a completely cut-away portion of the abutment lever 54. This will give three different dimensions of the abutment lever end 60 along the second path of movement of the respective control valve 21–24.

Next the three-way valve 72 is thrown to the opposite position to supply fluid under pressure to the outer ports 71 thus bringing the clapper plates 51 and 52 together. The selected one of the three different thicknesses on the abutment lever end 60 will selectively position each of the control valves 21–24.

Figure 4:
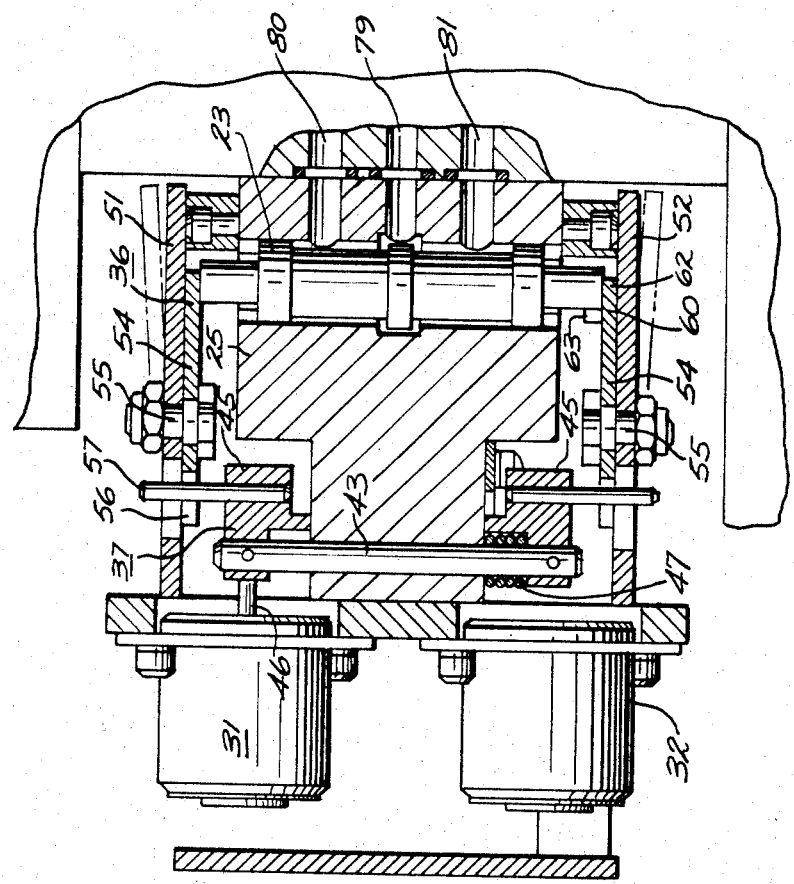
FIGURE 4 is a sectional view on line 4—4 of FIGURE 2.

Next the three-way valve 72 is thrown to the opposite position to supply fluid under pressure to the outer ports 71 thus bringing the clapper plates 51 and 52 together. The selected one of the three different thicknesses on the abutment lever end 60 will selectively position each of the control valves 21–24 in one of three positions along the second path. This may be the neutral position as shown in FIGURE 4 or may be axially to either end of this mid-position. Accordingly, fluid such as hydraulic fluid which is supplied to a port 79 is directed into a port 80 or a port 81 to selectively control the various yoke motors 15, FIGURE 1. These various yoke motors 15 move the gear yokes 14 and thus shift the geared transmission to the selected speed.

It will be noted that the solenoids 27–34 merely swing the abutment levers 54 in a first path and only when the clapper plates 51 and 52 are spread apart to permit free movement of these levers 54. Accordingly, the solenoids need not directly actuate the control valves 21–24 and thus are not called upon to exert forces such as might be the case should dirt be in the way of movement of one of the control valves 21–24. The movement of the abutment levers 54 in a first path which is transverse to the second path permits a variable dimension of the abutment end 60 of the levers 54 to effectively control the ultimate position of the respective control valves 21–24 upon the subsequent inward closing movement of the clapper plates 51 and 52 as moved by the hydraulic cylinder motor 66. This motor 66 may be made with large area pistons to have considerable reserve power to move all four control valves even though there may be dirt particles therein to assure positive gear engagement in the geared transmission 12.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and circuit elements may be resorted to without departing from the spirit and the scope of the invention as hereinafter claimed.

What is claimed is:
1. An electrically controlled fluid operated control system, comprising, in combination, a housing,
   solenoid means on said housing having first and second positions,
   abutment means,
   linkage means interconnecting said solenoid means and said abutment means to move same into first and second positions along a first path,
   power means carried on said housing and connected to move said abutment means in a direction in a second path transverse to said first path between first and second positions,
   a fluid control valve carried in said housing and having first and second positions along said second path,
means connected to move said power means to move said abutment means to said first position in said second path spaced from said control valve,
means connected to control said solenoid means to move said abutment means in said first path to one of said first and second positions,
and means connected to control said power means to move said abutment means to said second position thereof in said second path with said abutment means cooperating with said control valve to move same into one of said first and second positions thereof.

2. A control system as set forth in claim 1, wherein said solenoid means has first, second and third positions,
said abutment means has first, second and third positions along said first path,
and said control valve has first, second and third positions as controlled by said abutment means.

3. A control system as set forth in claim 1 wherein said abutment means includes an abutment lever pivoted for movement along an arcuate first path.

4. A control system as set forth in claim 1 wherein said abutment means includes an abutment lever pivoted along an axis generally parallel to said second path,
said linkage means includes a rocker shaft journalled in said housing along an axis generally parallel to said second path,
and said solenoid means acting to rock said rocker shaft to move said abutment lever in an arcuate first path.

5. A control system as set forth in claim 1 wherein said power means is a hydraulic power means and said control valve is a hydraulic control valve.

6. A control system as set forth in claim 1 wherein said linkage means includes crank means to move said abutment means in an arcuate first path.

7. A control system as set forth in claim 1 wherein said abutment means includes first and second clapper plates and an abutment lever pivoted on each axis generally parallel to said second path,
said clapper plates pivoted for movement generally parallel to said second path,
and said power means is a cylinder containing double pistons moved by fluid pressure and connected to move said clapper plates and said abutment levers along said second path.

8. A control system as set forth in claim 2 wherein said abutment means has three different dimensions along said second path for said first, second and third positions, respectively, of the abutment means in said first path.

9. A control system as set forth in claim 2 wherein said abutment means includes a clapper plate and an abutment lever pivoted thereon on an axis generally parallel to said second path,
said clapper plate pivoted for movement generally parallel to said second path,
and said power means connected to move said clapper plate and said abutment lever along said second path.

10. A control system as set forth in claim 9 wherein said linkage means includes a rocker shaft journalled in said housing along an axis generally parallel to said second path,
a rocker plate fixed on said rocker shaft and cooperating with said solenoid means to rock said rocker shaft in a limited arcuate movement from each side of a neutral position,
and yoke and crank means interconnecting said rocker plate and said abutment lever to move same in said first path with said abutment means having first, second and third dimensions along said second path for said first, second and third positions, respectively, of said abutment lever in said first path.

11. An electrically controlled hydraulically operated control system, comprising, in combination, a housing,
solenoid means on said housing having first, second and third positions,
a rocker shaft journalled in said housing along an axis and connected to be rocked into first, second and third positions by said solenoid means,
abutment means including an abutment lever connected to be moved along a first path by said rocker shaft into first, second and third positions,
hydraulic power means carried on said housing and connected to move said abutment means in a direction in a second path transverse to said first path between first and second positions,
a control valve carried in said housing and having first, second and third positions along said second path,
means connected to move said hydraulic power means to a first position wherein said abutment means is remote from said control valve,
means connected to control said solenoid means to move said abutment means in said first path to one of said first, second and third positions thereof,
and means connected to control said hydraulic power means to move said abutment means in said second path with said abutment means cooperating with said control valve to move same into one of said first, second and third positions thereof.

12. An electro-hydraulic control system comprising, in combination, a housing,
an axially reciprocable control valve in said housing having three positions including a mid position,
first and second solenoids mounted on said housing,
a rocker shaft journalled in said housing for limited arcuate movement,
spring means acting on said shaft urging same toward a rotational neutral position,
two rocker plates fixed on said shaft,
said solenoids being a pair acting on the two rocker plates on said shaft to move same a limited arcuate extent from each side of said neutral position,
a first and a second clapper plate carried on said housing for movement generally parallel to said shaft axis,
an abutment lever pivoted on each of said clapper plates on axes generally parallel to said shaft axis,
yoke and crank means interconnecting each of said rocker plates and said abutment levers to arcuately move said abutment levers on said two clapper plates,
a hydraulic cylinder motor in said housing to spread said first and second plates apart and to bring them together,
said abutment levers being a pair one on each of said clapper plates and said pair cooperating with said control valve,
a rotary tap switch connected to control energization selectively to said solenoids whereby said solenoids may be selectively energized to rock said rocker shaft to move said abutment levers with said hydraulic cylinder motor having spread said clapper plates apart,
and means connected to control said hydraulic cylinder motor to bring said clapper plates together and through the agency of said abutment levers to selectively move said control valve into one of three positions.

References Cited

UNITED STATES PATENTS

| | | | |
|---|---|---|---|
| 2,340,912 | 2/1944 | Van Hammersveld | 82—29 |
| 2,640,495 | 6/1953 | Baxter | 137—635 |
| 2,805,552 | 9/1957 | Hudson et al. | 82—29 XR |
| 2,916,018 | 12/1959 | Pabst et al. | 137—625 |
| 3,075,418 | 1/1963 | Mobius | 82—29 XR |
| 3,101,096 | 8/1963 | Frazer-Nash | 137—628 |
| 3,117,658 | 1/1964 | Hoelscher et al. | 82—29 XR |

HENRY T. KLINKSIEK, *Primary Examiner.*